US011059590B2

(12) United States Patent
Heidtmann et al.

(10) Patent No.: US 11,059,590 B2
(45) Date of Patent: Jul. 13, 2021

(54) FASTENING SYSTEM FOR FASTENING FITMENTS TO A FLOOR OF A CABIN OF A VEHICLE

(71) Applicant: AIRBUS OPERATIONS GMBH, Hamburg (DE)

(72) Inventors: Andreas Heidtmann, Hamburg (DE); Roland Lange, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 367 days.

(21) Appl. No.: 16/044,197

(22) Filed: Jul. 24, 2018

(65) Prior Publication Data
US 2019/0031354 A1    Jan. 31, 2019

(30) Foreign Application Priority Data
Jul. 25, 2017 (DE) .......................... 102017116824.9

(51) Int. Cl.
*B64D 11/06* (2006.01)
*B64C 1/20* (2006.01)

(52) U.S. Cl.
CPC ............ *B64D 11/0696* (2013.01); *B64C 1/20* (2013.01)

(58) Field of Classification Search
CPC ........ B64D 11/06; B64D 11/0696; B64C 1/20
See application file for complete search history.

(56) References Cited

U.S. PATENT DOCUMENTS

| 4,456,206 A * | 6/1984 | Tijssen | B64D 11/00 244/118.5 |
| 5,222,694 A * | 6/1993 | Smoot | B64C 1/066 244/119 |
| 5,489,172 A * | 2/1996 | Michler | B64C 1/20 244/118.1 |
| 5,520,357 A * | 5/1996 | Payne | B61D 45/006 244/118.1 |
| 6,039,519 A * | 3/2000 | Jones | B60P 7/08 410/69 |

(Continued)

FOREIGN PATENT DOCUMENTS

| DE | 102004012262 A1 | 9/2005 |
| DE | 102008006947 A1 | 8/2009 |

(Continued)

OTHER PUBLICATIONS

German Patent and Trademark Office, Search Report for German Patent Application No. DE102017116824.9 dated Jul. 2, 2018.

*Primary Examiner* — Michael H Wang
(74) *Attorney, Agent, or Firm* — Nixon & Vanderhye P.C.

(57) ABSTRACT

A fastening system for fastening fitments to a floor of a cabin of a vehicle has a receiving frame, a cantilever mounted on the receiving frame so as to be pivotable on a pivoting plane defined by the receiving frame, and having a mounting end and a fastening end, a first fastening element, and a multiplicity of second fastening elements. The first fastening element is arranged at the fastening end of the cantilever. The second fastening elements are positionable on the floor. The first fastening element is configured in a manner corresponding to the second fastening elements such that the first fastening element is mechanically connectable selectively to a second fastening element. A pivoting position of the cantilever is lockable relative to the receiving frame.

15 Claims, 2 Drawing Sheets

(56) References Cited

U.S. PATENT DOCUMENTS

| | | | | |
|---|---|---|---|---|
| 6,318,672 B1 * | 11/2001 | Traylor | ................ | B64D 11/00 |
| | | | | 244/118.5 |
| 7,374,131 B2 * | 5/2008 | Tiid | ..................... | B64D 9/003 |
| | | | | 244/118.5 |
| 7,455,276 B2 * | 11/2008 | Frey | ................ | B60N 2/01575 |
| | | | | 244/118.6 |
| 7,837,145 B2 * | 11/2010 | Wodak | .................. | B63B 29/06 |
| | | | | 244/118.6 |
| 9,599,138 B2 * | 3/2017 | Burd | ....................... | B64C 1/00 |
| 2012/0328364 A1 * | 12/2012 | Tkocz | ................ | B64D 11/04 |
| | | | | 403/322.4 |

FOREIGN PATENT DOCUMENTS

| | | |
|---|---|---|
| DE | 102008048744 A1 | 4/2010 |
| DE | 102015001201 A1 | 8/2016 |
| EP | 2269909 A1 | 1/2011 |
| WO | 9219496 A1 | 11/1992 |
| WO | 2010108775 A2 | 9/2010 |

\* cited by examiner

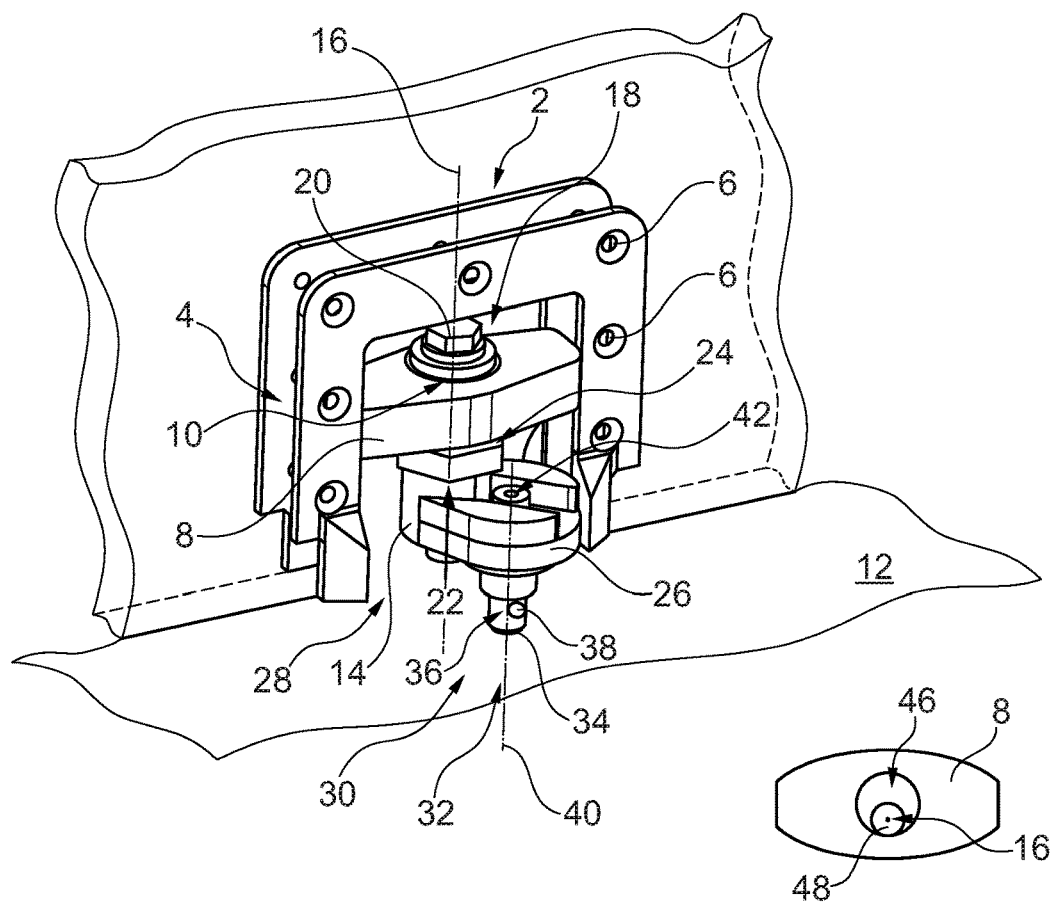
Fig. 1a
Fig. 1b
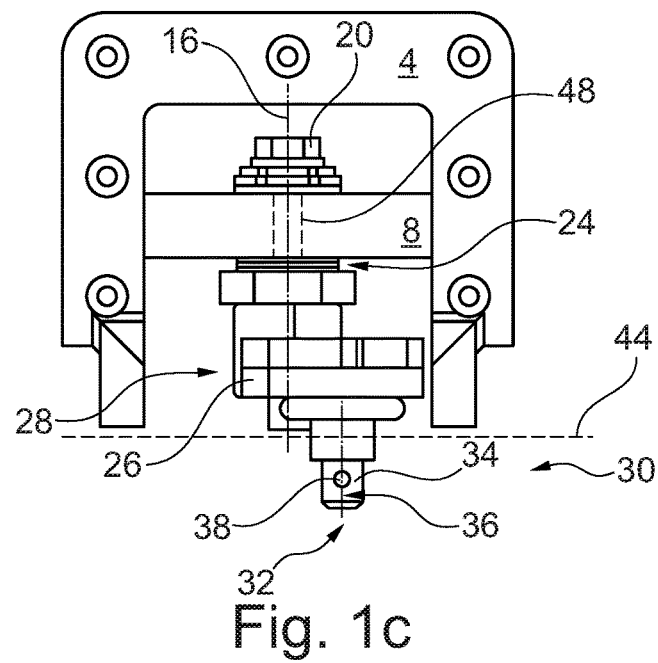
Fig. 1c

FASTENING SYSTEM FOR FASTENING FITMENTS TO A FLOOR OF A CABIN OF A VEHICLE

CROSS-REFERENCE TO PRIORITY APPLICATION

This application claims the benefit of, and priority to, German patent application number 102017116824.9, filed Jul. 25, 2017. The content of the referenced application is incorporated by reference herein.

TECHNICAL FIELD

Embodiments of the subject matter described herein relate generally to a fastening system for fastening fitments to a floor of a cabin of a vehicle. Furthermore, embodiments of the invention relate to a vehicle having a fuselage, a cabin formed therein, at least one fitment, and such a fastening system.

BACKGROUND

Vehicles for transporting persons usually have a cabin, which is fitted out with passenger seats and other fixtures, depending on the type and intended use of the vehicle. The fixtures can be for instance fitments which are provided for the comfort of all passengers located on board, and include in particular galleys, toilets, storage compartments and the like.

In order to fasten passenger seats in the cabin, a plurality of tracks extending parallel to one another are usually provided in or on the floor of the cabin, said tracks having openings for receiving fastening elements. The openings are arranged in a grid and are arranged for example at a spacing of 1 inch from one another along a straight line. Relatively large fitments, which are referred to as monuments in particular in aircraft, can be arranged on and connected to fastening elements, suitable therefor, in the floor. These could comprise such tracks or other suitable elements.

In order to increase the flexibility of the interior fittings of the vehicle, for example a commercial aircraft, it is known to change seat spacings between seats arranged one behind another, as required, in order to adapt in particular seating classes prior to a trip. Depending on wishes and requirements, the abovementioned fitments within the cabin can additionally be relocated, exchanged or removed or added. This can take place only in a grid of available fastening elements that is provided therefor.

Patent document DE 10 2008 048 744 A1 describes for instance a device for moving an object on a track, having latching openings, in an aircraft cabin, in which engagement elements engage continuously in the track. Patent document DE 10 2008 006 947 A1 shows a system for the simultaneous longitudinal displacement of seat rows in an aircraft. Patent document WO 2010/108775 A2 shows a ready-to-assemble monument, which is fitted out such that it can be fastened at different positions in a cabin.

BRIEF SUMMARY

An object of the disclosure is to provide a fastening element or a fastening system which is configured such that particularly flexible fastening of a fitment in a cabin of a vehicle is allowed without dimensions and the installation location being determined entirely by a grid arranged in the floor and without the fitment having to be aligned with this capability.

A fastening system for fastening fitments to a floor of a cabin of a vehicle is proposed. The fastening system has a receiving frame, a cantilever which is mounted on the receiving frame so as to be pivotable on a pivoting plane defined by the receiving frame and has a mounting end and a fastening end, a first fastening element, and a multiplicity of second fastening elements. The first fastening element is arranged at the fastening end of the cantilever. The second fastening elements are positionable on the floor of the cabin of the vehicle. The first fastening element is configured in a manner corresponding to the second fastening elements such that the first fastening element is mechanically connectable selectively to a second fastening element. A pivoting position of the cantilever is lockable relative to the receiving frame.

Consequently, the fastening system has three main components, which are arranged on the fitment to be fastened. In this case, the receiving frame is fastenable to the fitment and forms a base for the cantilever, which is mounted in a pivotable manner on the receiving frame. The shape and design of the receiving frame is immaterial in this case, as long as the receiving frame can be fastened to or in the fitment. The configuration of the fitment, which can be for example a monument to be fastened to a floor in an aircraft cabin, does not have to be adapted to the variable fastenability.

The receiving frame defines a pivoting plane on which the cantilever is movable relative to the fitment. The moving of the cantilever has the objective of it being possible to position the fastening end of the cantilever variably at those points which correspond to the second fastening elements. The fastening end can accordingly be positioned at least to a certain degree independently of the fitment, in order for it to be possible to fasten the first fastening element to a second fastening element aligned therewith. The free movability of the cantilever, or of the fastening end of the cantilever, is in this case limited by the shape and the extent of the cantilever itself.

The movement of the cantilever can take place in particular manually, i.e. a user can move the cantilever freely to a desired position, as long as it is not locked. The moving can take place by handling the cantilever, for example at the fastening end. Alternatively, it would also be conceivable to apply a tool to the cantilever or a component connected thereto.

Since the fastening end has to be able to take up different positions on the cabin floor, it is understandable that the pivoting plane should preferably be oriented parallel to the cabin floor. The receiving frame and the pivoting plane should consequently be designed or selected such that, in the case of a receiving frame fastened to the fitment, the pivoting plane is oriented parallel to the floor. If the fitment has for instance vertical walls, to which the receiving frame is intended to be fastened, the pivoting plane can extend perpendicularly to the wall in question.

The cantilever can furthermore be configured in a relatively discretionary manner, in order for it to be possible to bring about a required distance from the mounting end to the fastening end. The section between the mounting end and the fastening and consequently passes over the pivoting plane, wherein the mounting end remains at the same position in or on the receiving frame.

The locking of the cantilever in a position that has been taken up or set fixes the orientation thereof at least for a desired period of time, i.e. until the fitment is possibly repositioned, and the first fastening element remains positioned in an immovable manner, allowing secure fastening to a second fastening element. The cantilever can be locked via different measures. These include for instance the use of form-fitting elements, force-fitting elements or a combination thereof. Form-fitting elements can include for instance a combination of axle elements with pins that are insertable transversely thereto, furthermore openings and axle elements with non-circular cross sections, screw elements or the like. The type and design of locking is immaterial for the basic function. Depending on the choice, however, stepless and incremental rotation or pivoting of the cantilever can be supported.

The first fastening element should be selected and designed such that problem-free locking of the first fastening element to a second fastening element corresponding thereto can be carried out. While screw elements, locking bodies and ball lock pins may be suitable elements, a multiplicity of other first fastening elements and second fastening elements corresponding thereto are conceivable and can be taken into consideration by a person skilled in the art.

In summary, a fastening system is consequently produced, with which fitments, for example monuments in a cabin of an aircraft, are positionable and fastenable in a much more flexible manner, since the cantilever with the first fastening element arranged thereon allows larger operating ranges.

In an advantageous embodiment, the cantilever is mounted about a pivot axis that extends through the mounting end and is perpendicular to the pivoting plane. The fastening end can consequently be pivoted about the mounting end or the pivot axis on a circular path. In this way, particularly simple pivotability is realized and, depending on the length of the cantilever, i.e. depending on the distance between the mounting end and fastening end, large areas of a cabin floor can be covered.

In a likewise advantageous embodiment, the cantilever is lockable in several discrete pivoting positions, wherein the pivoting positions are arranged at a predefined angular increment to one another. The provision of incremental movement can support the locking of the cantilever when for example the cantilever is latchable in different discrete positions and is additionally locked at these positions. Depending on the geometric grid of the second fastening elements on the floor, this can limit the flexibility of positioning of the fitment, but this is much greater than without the fastening system disclosed here, and additionally supports the precise positioning of the fitment.

The angular increment can be selected from a group of angular increments, wherein the group comprises 15°, 30°, 45°, 60° and 90°. When an angular increment of 90° is used, four latching positions of the cantilever on the pivoting plane are consequently possible. When 45° is used as the angular increment, the cantilever can be latched in place in eight different positions on the pivoting plane. The choice of the angular increment can be left up to a person skilled in the art and could be selected taking the geometric grid of the second fastening elements or the provided position grid for fitments into consideration.

In an advantageous embodiment, the first fastening element is embodied as a ball lock pin. A ball lock pin is an in particular elongate component which has, at a first end, an actuating device and, at a second end, one, two or more balls that are movable transversely to the main direction of extension of the component. By actuation of the actuating element, the balls are largely freely movable such that the pin is pluggable into an opening, the balls afford only little resistance in the process and are pushed into their ball seat. If the actuating element is released, the balls are braced by a spring mechanism or the like such that they are pushed out via the lateral surface of the pin and prevent the pin from being pulled out of the opening by way of considerable mechanical resistance. Such ball lock pins are self-securing or can be unsecured and secured manually.

In a further advantageous embodiment, the first fastening element can have a rotary or clamping fitting. Such a fitting could correspond for example to a fitting as is used for fastening seats to seat tracks in a vehicle and in particular an aircraft. In such fittings, a mushroom-shaped locking element is provided, which is introducible for instance into one of several openings in a seat track, in order then to effect, from a cavity in the seat track, clamping of a bar between two successive openings of the seat track. Other variants are also conceivable, however, with which a person skilled in the art is familiar and which can be selected depending on the design of the second fastening elements. This can also depend on the available installation space at the fastening end and on the size of the fitment to be fastened.

Preferably, an axle component is mounted in a rotatable manner at least indirectly on the receiving frame, and the mounting end of the cantilever is connected to the axle component. Consequently, the axle component allows the cantilever to be pivoted and to be locked on the receiving frame by locking of the axle component. The use of an axle component can additionally allow a certain tolerance or movability perpendicularly to the pivot axis, this allowing in particular the introduction and removal of the first fastening element into and from a corresponding second fastening element.

The axle component can furthermore be mounted in an eccentric bush, which has eccentricity located in the pivoting plane. The use of the eccentric bush considerably increases the flexibility of the fastening system, since for example imprecise positioning of the fitment and second fastening elements with respect to one another can be compensated by adjusting such an eccentric bush. The eccentric bush can be mounted in a stepless manner in a corresponding seat, or has a non-circular profile, which fits in an opening with a corresponding, non-circular opening. The profile could have for instance a toothing or be polygonal. In this way, accidental rotation of the eccentric bush can additionally be avoided. As a result of the use of the eccentric bush, tolerance compensation in the pivoting plane is consequently allowed.

The axle component, if one is used, is lockable preferably via at least one screw element. For example, the axle component can be fitted in a bore and project beyond this bore at two mutually opposite ends. While the cantilever is arranged at one end, at least one screw element can be arranged at the other end. Of course, it is possible to also use a plurality of screw elements, which can establish a counter screw connection. The use of screw elements furthermore allows much easier setting of an axial position of the cantilever and the subsequent locking of the cantilever in this set axial position. As a result of the use of the screw elements, it is consequently possible for tolerances perpendicular to the pivoting plane to be compensated. Moreover, the screw elements alone can allow locking in a position parallel to the pivoting plane, and further means are not absolutely necessary for this purpose.

As set out above, the first fastening element or the cantilever can be movable in a direction perpendicular to the pivoting plane, in order to introduce the first fastening element into a second fastening element or to remove it therefrom. In this way, in particular production-related or equipment-related tolerances perpendicular to the pivoting plane are compensated.

For example, the second fastening elements can be arranged in a seat track, which is positionable in a floor of the cabin. The positioning of the fitment can consequently be carried out in a finer grid than the seat track has.

Embodiments of the invention also relate to a vehicle having a vehicle fuselage, a cabin, formed therein, with a floor, and a fitment, wherein the fitment is fastened to the floor via at least one fastening system, wherein the second fastening elements are arranged on the floor.

In an advantageous embodiment, the second fastening elements are openings in the floor. In this way, it is possible for instance for a ball lock pin to be inserted at the fastening end.

Alternatively or additionally, the second fastening elements are positioned in at least one seat track arranged on the floor, as already explained above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure can be gathered from the following description of the exemplary embodiments and the figures. In this case, all the features that are described and/or depicted form the subject matter of the disclosure on their own and in any desired combination, regardless of their combination in the individual claims or the back-references thereof. In the figures, furthermore, identical reference signs stand for identical or similar objects.

FIGS. 1a, 1b and 1c show the fastening system in an assembled form (FIG. 1b: detail of a central piece).

DETAILED DESCRIPTION

Figure 2:
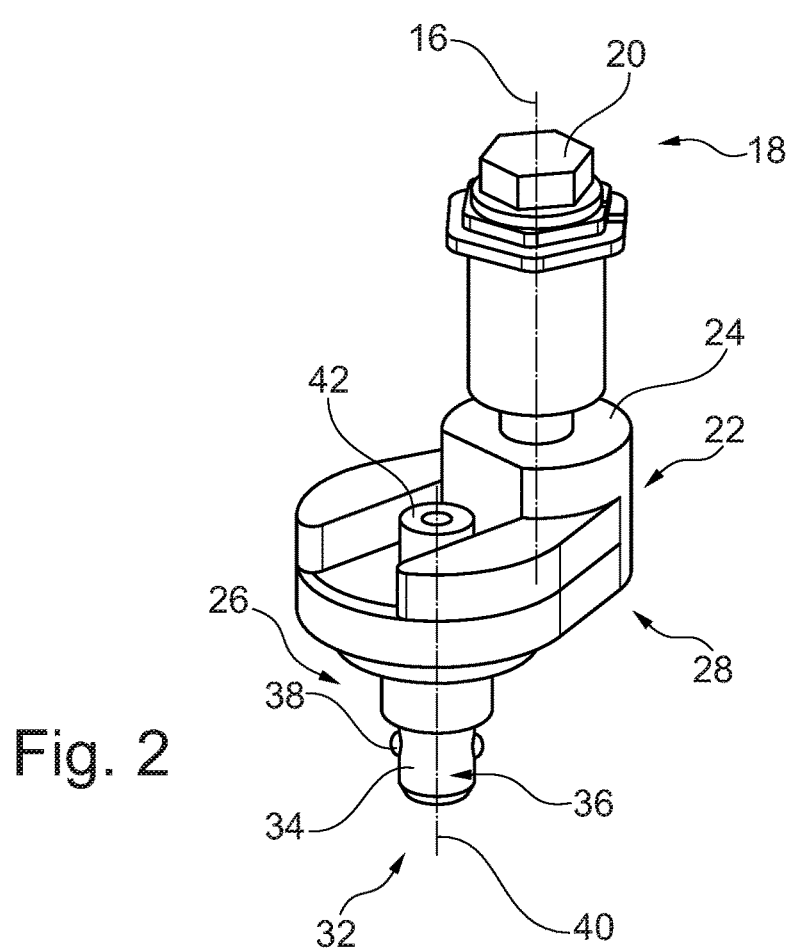
FIG. 2 shows an axle component with a cantilever fastened thereto in a three-dimensional illustration.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

FIGS. 1a and 1c show a fastening system 2 having a receiving frame 4 which is positionable on the fitment to be fastened. To this end, the receiving frame 4 has for example a plurality of screw holes 6, into which suitable screws are introducible.

The receiving frame 4 is designed in a double-walled manner in the illustration shown, such that it can enclose a contour of a wall or of an opening periphery of a wall. The design consequently allows for example positioning in a cutout in a wall of a monument. The possible course of such a wall is illustrated in a dashed and cutaway manner.

Arranged in the receiving frame 4 is a central piece 8 that has a bore 10. As is clear from the illustration, the central piece 8 is arranged substantially parallel to a cabin floor 12. In the bore 10, an axle component 14 is positioned and mounted so as to be rotatable about a pivot axis 16. Arranged at a first end 18 of the pivot axis 16 is a screw element 20, while a shoulder 24 is provided at a second end 22. By way of the screw element 20, the axle component 14 can be locked firmly to the central piece 8. If the screw element 20 is not tightened, a cantilever 26 arranged at the second end 22 can be pivoted on a plane which is parallel to the cabin floor 12.

The cantilever 26 has a mounting end 28 and a fastening end 30. Arranged at the fastening end 30 is a first fastening element 32, which is designed as a ball lock pin in the illustration shown. The first fastening element 32 has a pin 34, on the circumferential lateral surface 36 of which a plurality of balls 38 are arranged, which are movable transversely to a main axis of extension 40. The pin 34 can consequently be plugged into an opening (not shown), wherein the balls 38 are then pushed into the interior of the pin 34 and after plugging into the respective opening are pushed back out via the lateral surface 36. The pivoting in and out can be controlled, i.e. prevented or enabled, by an actuating element 42. The actuating element can be a peg, a button or the like, which is able to be pushed in. As a result of the pushing in, it may be possible for instance for the balls 38 to be released, and to be locked again upon disengagement.

FIG. 1b furthermore illustrates a plan view of the central piece 8, in which an eccentric bush 46 is arranged by way of example, said eccentric bush being mounted so as to be rotatable about an axis of rotation extending perpendicularly to the pivoting plane 44, and having an eccentric through-opening 48. Through the latter, it is possible for the axle component 14 to be plugged. The provision of the eccentric bush 46 allows easy adaptation of the position of the axis of rotation 16 relative to the receiving frame 4.

FIG. 1c shows the design of the fastening system 2 in front view. Here, the course of a pivoting plane 44 is illustrated by a dashed line.

In FIG. 2, the cantilever 26 is shown with the axle component 14, without the receiving frame 4 and the central piece 8. Of course, other variants with a differently designed cantilever 26 are also possible.

Figure 3:
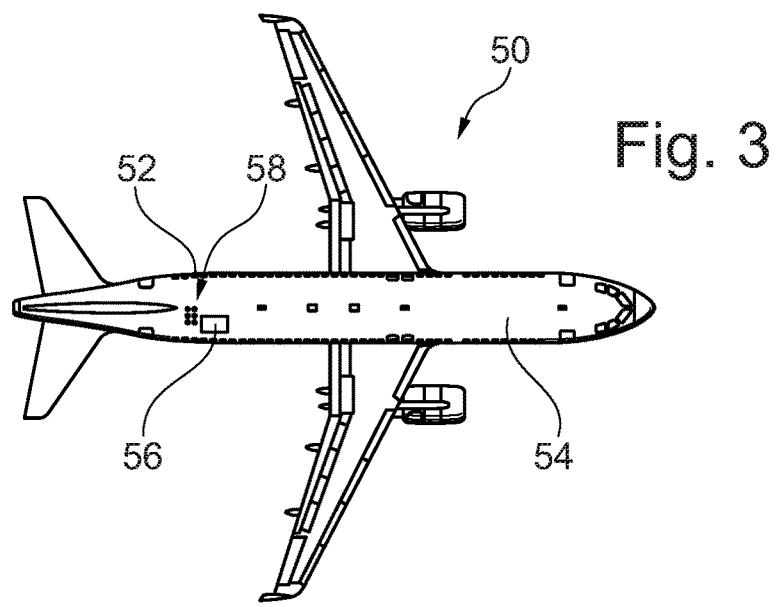
FIG. 3 shows an aircraft with a fitment in a cabin.

Finally, FIG. 3 shows an aircraft 50 having an aircraft fuselage 52, a cabin 54 formed therein, and a monument 56 as fitment on a floor 12, said monument being fastened with the aid of a fastening system 2. To this end, a plurality of second fastening elements 58 are positioned on the floor 12, it being possible for first fastening element 32 to engage selectively in said second fastening elements 58.

In addition, it should be noted that "having" does not rule out other elements or steps, and "a/an" or "one" does not rule out a plurality. Furthermore, it should be noted that features which have been described with reference to one of the above exemplary embodiments can also be used in combination with other features of other above-described exemplary embodiments. Reference signs in the claims should not be considered to be limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system to fasten fitments to a floor of a cabin of a vehicle, comprising:
   a receiving frame including an arch defining an open area between legs of the arch, wherein the legs have lower ends configured to be adjacent the floor;
   a central piece mounted to and between the legs of the receiving frame and positioned in the open area of the receiving frame, wherein the central piece includes an upper surface, a lower surface and a bore extending between the upper and lower surfaces, wherein the upper surface faces an upper portion of the arch, the lower surface is separated from the floor by a gap, and the bore has a pivoting axis parallel to a pivoting plane defined by the arch of the receiving frame;
   an axle component within the bore and pivots about the pivoting axis within the bore;
   a cantilever including a mounting end and a fastening end, wherein the mounting end is mounted to the axle component such that the cantilever pivots with the axle component, and the cantilever is at least partially in the gap beneath the lower surface of the central piece and the floor;
   a screw element fastened to an upper end of the axle component and positioned between the upper surface of the central piece and the upper portion of the arch, wherein the screw element is adjustable to engage the axle component and the upper surface of the central piece to fix an angular position of the axle component and the cantilever with respect to the bore;
   a first fastening element; and
   a multiplicity of second fastening elements;
   wherein the first fastening element is fixed to the fastening end of the cantilever;
   wherein the second fastening elements are fixed to the floor of the cabin of the vehicle;
   wherein the first fastening element is configured in a manner corresponding to the second fastening elements such that the first fastening element is mechanically connectable selectively to a second fastening element; and
   wherein a pivoting position of the cantilever is lockable relative to the receiving frame by securing the screw element to the axle component and the upper surface of the central piece.

2. The fastening system according to claim 1, wherein the cantilever is lockable, due to the engagement between the screw element, the axle component and the upper surface of the central piece, in several discrete pivoting positions, wherein the pivoting positions are arranged at a predefined angular increment to one another.

3. The fastening system according to claim 2, wherein the angular increment is selected from a group of angular increments, the group comprising 15°, 30°, 45°, 60° and 90°.

4. The fastening system according to claim 1, wherein the first fastening element comprises a ball lock pin.

5. The fastening system according to claim 1, wherein the first fastening element has a rotary or clamping fitting.

6. The fastening system according to claim 1, wherein the first fastening element or the cantilever is movable in a direction perpendicular to the pivoting plane, in order to introduce the first fastening element into a second fastening element or to remove it therefrom.

7. The fastening system according to claim 1, wherein the second fastening elements are arranged in a seat track, which is positionable in a floor of the cabin.

8. The fastening system of claim 1 further comprising:
   at least one ball in a recess of a sidewall of the first fastening element, wherein the at least one ball are movable transversely with respect to the sidewall, and
   an actuating element mounted to the first fastening element and adjacent the cantilever element, wherein the actuating element is configured to release the at least one ball for movement with respect to the sidewall and to lock the at least one ball relative to the sidewall.

9. The A fastening system to fasten fitments to a floor of a cabin of a vehicle, the fastening system comprising:
   a receiving frame including an arch defining an open area between legs of the arch, wherein the legs have lower ends configured to be adjacent the floor;
   a central piece mounted to and between the legs of the receiving frame, positioned in the open area and separated by a gap from the floor, wherein the central piece includes a bore having a first axis parallel to a pivoting plane defined by the arch of the receiving frame;
   a cantilever including a mounting end and a fastening end, wherein the mounting end is mounted to the axle component and the cantilever is at least partially in the gap beneath the lower surface of the central piece and the floor;
   an eccentric bush in the bore of the central piece and configured to turn about the first axis, and the eccentric bush including a through-opening having a second axis offset from and parallel to the first axis and the second axis extends through the bore of the central piece;
   an axle component amounted in the through-opening of the eccentric bush and configured to turn both about the first and second axes, wherein the mounting end of the cantilever is mounted to the axle component;
   a first fastening element mounted to the fastening end of the cantilever; and
   a multiplicity of second fastening elements;
   wherein the first fastening element is fixed to the fastening end of the cantilever;
   wherein the second fastening elements are fixed to the floor of the cabin of the vehicle;
   wherein the first fastening element is mechanically connectable selectively to at least one of the second fastening elements;
   wherein an angular pivoting position of the cantilever with respect to the pivoting plane is determined at least partially by an angular position of the axle component with respect to the first axis, and
   wherein the angular pivoting position of the cantilever is lockable relative to the receiving frame.

10. The fastening system according to claim 9, wherein the axle component is lockable via at least one screw element.

11. The fastening system of claim 9 further comprising:
   at least one ball in a recess of a sidewall of the first fastening element, wherein the at least one ball are movable transversely with respect to the sidewall, and
   an actuating element mounted to the first fastening element and adjacent the cantilever element, wherein the actuating element is configured to release the at least one ball for movement with respect to the sidewall and to lock the at least one ball relative to the sidewall.

12. A vehicle comprising:
a vehicle fuselage;
a cabin formed in the vehicle fuselage;
a floor of the cabin; and
a fitment fastened to the floor of the cabin via a fastening system comprising:
a receiving frame including an arch defining an open area between legs of the arch, wherein the legs have lower ends configured to be adjacent the floor;
a central piece mounted to and between the legs of the receiving frame, positioned in the open area and separated by a gap from the floor, wherein the central piece includes a bore having a first axis parallel to a pivoting plane defined by the arch of the receiving frame;
an eccentric bush in the bore of the central piece and configured to turn about the first axis, wherein the eccentric bush includes a through-opening having a second axis offset from and parallel to the first axis and the second axis extends through the bore of the central piece;
an axle component mounted to the eccentric bush and configured to pivot with respect to the eccentric bush about a second pivot axis offset from the first pivot axis and parallel to the pivoting plane;
a cantilever including a mounting end and a fastening end, wherein the mounting end is fixed to the axle component such that the cantilever turns about at least the first axis;
a first fastening element; and
a multiplicity of second fastening elements;
wherein the first fastening element is fixed to the fastening end of the cantilever;
wherein the second fastening elements are fixed to the floor of the cabin;
wherein the first fastening element is configured in a manner corresponding to the second fastening elements such that the first fastening element is mechanically connectable selectively to a second fastening element; and
wherein a pivoting position of the cantilever is lockable relative to the receiving frame.

13. The vehicle according to claim 12, wherein the second fastening elements comprise openings in the floor.

14. The vehicle according to claim 12, wherein the second fastening elements are positioned in at least one seat track arranged on the floor.

15. The vehicle of claim 12 further comprising:
at least one ball in a recess of a sidewall of the first fastening element, wherein the at least one ball are movable transversely with respect to the sidewall, and
an actuating element mounted to the first fastening element and adjacent the cantilever element, wherein the actuating element is configured to release the at least one ball for movement with respect to the sidewall and to lock the at least one ball relative to the sidewall.

* * * * *